US008843894B2

(12) United States Patent
Dawson et al.

(10) Patent No.: US 8,843,894 B2
(45) Date of Patent: Sep. 23, 2014

(54) PREFERENTIAL EXECUTION OF METHOD CALLS IN HYBRID SYSTEMS

(75) Inventors: Michael H. Dawson, Ottawa (CA); Parijat Dube, Yorktown Heights, NY (US); Liana L. Fong, Irvington, NY (US); Yuqing Gao, Mount Kisco, NY (US); Xavier R. Guerin, White Plains, NY (US); Michel H. T. Hack, Cortlandt Manor, NY (US); Megumi Ito, Kanagawa-ken (JP); Graeme Johnson, Ottawa (CA); Nai K. Ling, Tuckahoe, NY (US); Yanbin Liu, New Haven, CT (US); Xiaoqiao Meng, Yorktown Heights, NY (US); Pramod B. Nagaraja, Karnataka (IN); Seetharami R. Seelam, Yorktown Heights, NY (US); Wei Tan, Elmsford, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 13/417,878

(22) Filed: Mar. 12, 2012

(65) Prior Publication Data

US 2013/0235992 A1 Sep. 12, 2013

(51) Int. Cl.
*G06F 9/45* (2006.01)
(52) U.S. Cl.
USPC .......................................... 717/124; 717/131
(58) Field of Classification Search
None
See application file for complete search history.

(56) References Cited

U.S. PATENT DOCUMENTS

| 6,424,992 | B2 | 7/2002 | Devarakonda et al. |
| 6,640,289 | B2 | 10/2003 | McCrory et al. |
| 7,426,622 | B2 | 9/2008 | Yoder |
| 7,890,809 | B2 * | 2/2011 | Nye et al. ...................... 705/7.11 |
| 8,176,475 | B2 | 5/2012 | Kosche et al. |
| 2004/0064829 | A1 | 4/2004 | Pallister et al. |
| 2004/0267804 | A1 | 12/2004 | Fresko et al. |
| 2005/0039187 | A1 | 2/2005 | Avakian et al. |
| 2007/0011682 | A1 | 1/2007 | Loboz et al. |
| 2008/0019351 | A1 | 1/2008 | Piper et al. |
| 2008/0028179 | A1 | 1/2008 | Mannarswamy et al. |
| 2009/0031317 | A1 | 1/2009 | Gopalan et al. |
| 2009/0126006 | A1 | 5/2009 | Zhang et al. |
| 2010/0275206 | A1 | 10/2010 | Mewhinney et al. |
| 2010/0312891 | A1 | 12/2010 | Pairault et al. |
| 2011/0060744 | A1 | 3/2011 | Brignull |

OTHER PUBLICATIONS

Office Action dated Mar. 4, 2014 received in a related U.S. Appl. No. 13/616,417.

(Continued)

*Primary Examiner* — Chuck Kendall
(74) *Attorney, Agent, or Firm* — Scully, Scott, Murphy & Presser, P.C.; Preston J. Young, Esq.

(57) ABSTRACT

Affinity-based preferential call technique, in one aspect, may improve performance of distributed applications in a hybrid system having heterogeneous platforms. A segment of code in a program being executed on a processor may be intercepted or trapped in runtime. A platform is selected in the hybrid system for executing said segment of code, the platform determined to run the segment of code with best efficiency among a plurality of platforms in the hybrid system. The segment of code is dynamically executed on the selected platform determined to run the segment of code with best efficiency.

13 Claims, 5 Drawing Sheets

(56) References Cited

OTHER PUBLICATIONS

IBM et al.; "Method for Software-Enforced Strict Processor Affinity to Reduce Coherency Traffic in a Cache-Coherent MP System", Dec. 28, 2004.

IBM et al. ; "Dispatcher Queue to Provide Processor Affinity in a Multiprocessor", Feb. 1994, vol. 37, No. 02A.

Rafique et al. "A capabilities-aware framework for using computational accelerators in data-intensive computing." Journal of Parallel and Distributed Computing, vol. 71, issue 2, Feb. 2011, pp. 185-197.

International Search Report and Written Opinion mailed May 28, 2013 in related International Application No. PCT/US13/28795.

* cited by examiner

PREFERENTIAL EXECUTION OF METHOD CALLS IN HYBRID SYSTEMS

FIELD

The present application relates generally to computers and hybrid computing systems with heterogeneous processors, and more particularly to execution of code on processors for improving performance in hybrid systems.

BACKGROUND

Computing systems can contain heterogeneous processors. For instance, general and special processors such as a graphical processing unit (GPU), field programmable gate array (FPGA) may together make up a computing system. Another example of a hybrid system is zEnterprise BladeCenter Extension (zBX) infrastructure from International Machines Corporation (IBM®), Armonk, N.Y., which infrastructure includes system Z196, X86 blades and Power7 blades; the Z196 and blades are connected by private network. With emerging commercial workloads processing massive data and demanding CPU cycles, more and more successful applications could benefit from running on hybrid systems.

Data locality is one factor that determines software performance in such hybrid systems. Data locality means that data requested by applications are preferentially from filesystems which are local to where they are consumed. There are known solutions for leveraging data locality to improve distributed software performance. However, they do not consider other types of locality associated with hybrid systems.

BRIEF SUMMARY

Methods and system for running distributed programs in a hybrid system having heterogeneous platforms may be provided. A method for running distributed programs in a hybrid system having heterogeneous platforms, in one aspect, may include trapping a program's method call in runtime of a program executing on a processor. The method may also include looking up a symbolic reference associated with the trapped method call for one or more platform-specific implementations. The method may further include selecting a platform-specific implementation from said one or more platform-specific implementations based on affinity measure associated with said one or more platform-specific implementations, the affinity measure indicating how efficiently said one or more platform-specific implementations run on respective one or more platforms in said hybrid system. The method may yet also include returning a direct reference to the selected platform-specific implementation. The method may yet further include replacing the symbolic reference associated with the trapped method call with the returned direct reference to the selected platform-specific implementation.

In another aspect, a method for affinity-based preferential call technique for improving performance of distributed applications in a hybrid system having heterogeneous platforms, may include intercepting in runtime a segment of code in a program being executed on a processor. The method may also include determining a platform in the hybrid system for executing said segment of code, the platform determined to run the segment of code with best efficiency among a plurality of platforms in the hybrid system. The segment of code may be dynamically executed on the platform determined to run the segment of code with best efficiency.

A system for running distributed programs in hybrid system, in one aspect, may include a processor in the hybrid system running an application program. An affinity-based preferential call module may be operable to intercept a program's method call in runtime. The affinity-based preferential call module may be further operable to look up a symbolic reference associated with the trapped method call for one or more platform-specific implementations. The affinity-based preferential call module may be further operable to select a platform-specific implementation from said one or more platform-specific implementations based on affinity measure associated with said one or more platform-specific implementations. The affinity measure indicates how efficiently said one or more platform-specific implementations run on respective one or more platforms in the hybrid system. The affinity-based preferential call module may be further operable to replace the symbolic reference associated with the trapped method call with a direct reference to the selected platform-specific implementation.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
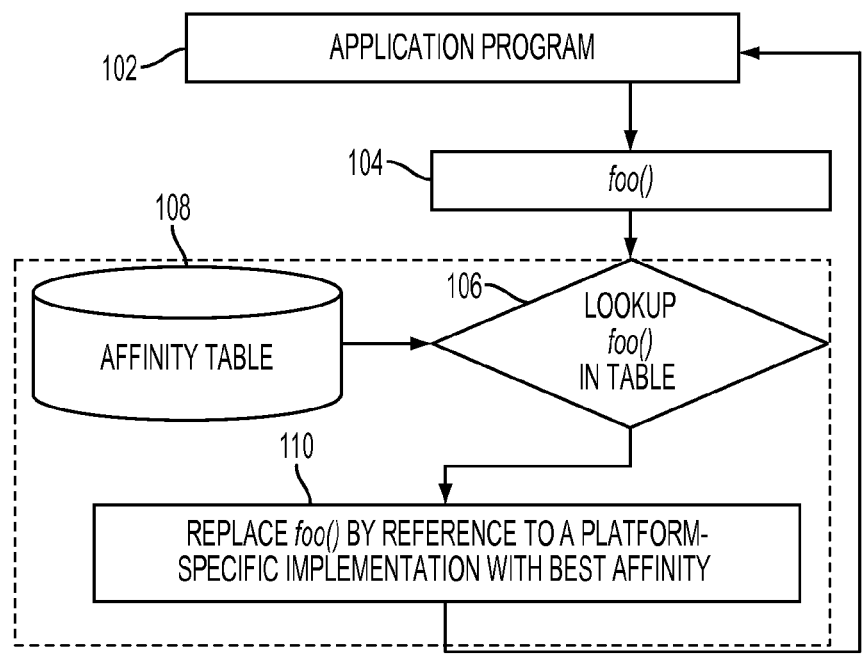
FIG. 1 illustrates a concrete example for preferential method call in one embodiment of the present disclosure.

A hybrid system in the present disclosure generally refers to a heterogeneous distributed system that contains both general and special-purposed computing platforms. Since hybrid systems could serve as flexible platforms for optimizing workload in terms of performance and price ratio, software applications could benefit from running in hybrid systems. For example, for applications running on IBM® zBX, while the components with priority on security and reliability could be placed on Z196 chip, the components with priority on computation could be placed on X86 or Power7 microprocessor blades.

The present disclosure in one embodiment addresses improving performance in a hybrid system, by considering function locality. Function locality in the present disclosure means that functions (or code) being executed are preferentially a version that works best for the particular platform. A platform may contain both hardware and software in one embodiment of the present disclosure. The "function locality" in one embodiment of the present disclosure is with respect to platforms. For example, in general the IBM® Power platform has better support for floating point computation than the IBM® Z platform. Thus, in a hybrid system having both Z and Power platforms, a function with significant floating point computation could be provided two versions, one for Z and another for Power separately. While the Power version has direct calls for floating point calculation, the Z version could use some float-point emulation acceleration. Leveraging function locality could significantly improve software performance in hybrid systems.

In one embodiment of the present disclosure, a technique referred to herein as "preferential method call" is disclosed that may improve software performance running in hybrid systems. In one aspect, the preferential method call is an "affinity-based preferential method call" technique that may improve the performance of distributed applications in a hybrid system. In this technique, preferential method call may be made based on comparing the affinity of a method on different platforms. A method, function or procedure refers to a programming module or a set of instructions for execution on a processor or platform. In addition, the methodologies of the present disclosure may apply to a segment of code, work unit or the like in a program; thus, the methodologies described herein need not be limited to a "method" per se in an application program.

Affinity in the present disclosure in one embodiment refers to the efficiency of running a segment of code on a type of platform, e.g., how well a platform runs a given function. For instance, the affinity of a method on a platform characterizes how efficiently this method can be executed on the platform. This efficiency may be decided by the inherent pattern of the method and the platform characteristics. A method may be dynamically executed on the platform where the method has the best affinity. Thus, for example, software method calls may be dynamically executed in different processors of a hybrid system or a system with heterogeneous platforms. In the present disclosure in one embodiment, the affinity-based methodology determines on which processor of the heterogeneous platforms the software or segment of code should be executed. In this way, running of an application program may be optimized, for instance, by addressing the optimization at application level for a distributed system.

This affinity-based execution technique may be also applied to data reading wherein the data with better locality is preferred to be read. In one embodiment of the present disclosure, method affinity takes into consideration the data locality. In one embodiment of the present disclosure, the affinity may be updated in both offline and online manners. The advantage of the methodologies disclosed herein includes exploiting the implicit difference in a hybrid system such that a work item is executed on the place which may suit the work item the best.

As an example, consider the IBM® zBX. IBM® zBX is a hybrid system that includes both Z and Power platforms. Methods that need to access significant amount of data stored on Z may have higher affinity by executing on Z because of data locality. If those methods are running on Power, they can be called on Z, and Z data can be provided to applications in a more efficient manner. Methods that require strong single threaded performance also have high affinity on Z platform as Z has fastest threads in the industry currently. Methods that require strong security and unique quality of service are also the methods with high affinity on Z.

Methods with high affinity on Power may include long running applications with little or minimal data requirements, multiple parallel threads that benefit from SMT (Simultaneous Multi-Threading) on Power, methods that require significant amount of main memory, methods that require memory bandwidth, and analytics algorithms that are computation intensive (e.g., floating point operations).

In practice, affinity could be gauged in different representations. It could be a Boolean variable indicating whether a method can or cannot run on a platform, or how a method in general prefers one platform than the other; it could be a numerical performance measure (e.g., throughput or response time); it could also be a fuzzy variable which shows how the method prefers one platform to the others based on a priori knowledge; it could also be a cost/performance ratio based value to gauge the relative benefit for running the method on each platform.

The present disclosure in one embodiment may provide for leveraging of the platform affinity to improve software performance and cost-efficiency in hybrid systems. Implicit heterogeneity in hybrid systems may be exploited such that each work unit in a workload is placed and executed on the platform with the best performance/cost ratio. In one embodiment of the present disclosure, when a method is called in running a program, the method is trapped. The method may have multiple copies of platform-specific implementations and each implementation is executable at the time when the method is trapped. The reference and associated affinity for these multiple implementations may be stored in an affinity table or the like. By looking up the affinity table, a decision may be made to select the platform with the best affinity for that method. This decision may consider both the affinity and the overhead for running the implementation. The above-described methodology is referred to as preferential method call.

FIG. 1 illustrates a concrete example for preferential method call in one embodiment of the present disclosure. An application programming 102 having a method named "foo( )" runs and calls the method at 104. When the method is called, the symbolic reference may be intercepted or trapped, together with running environment information. This information may be passed to a process which looks up all platform-specific implementations for that method. At 106, the method, foo( ), is looked up. For instance, an affinity table 108 or the like may store affinity measure, a value or factor or such indication associated with each of different platform implementations of the method. The table 108 may also store other information such as the overhead for running each of the different platform implementation. From the information looked up in the table 108, a determination is made as to the specific platform implementation that has the best affinity. Furthermore, the implementation with least overhead may be considered for selection. A direct reference to the implementation with the best affinity may be returned as the substitute for the trapped method. At 110, the specific platform implementation determined or selected to have the best affinity and optionally the least overhead, replaces the method call to foo( ), for example, by reference. In one embodiment of the present disclosure, symbolic reference replacement is used to achieve runtime re-distribution of a portion of application software.

In one embodiment of the present disclosure, a separate piece of software or like may be responsible for creating and updating the affinity table.

The preferential execution of the present disclosure may apply to a segment of code (part of the program 102), for example, described above as method foo( ). In one embodiment of the present disclosure, methods or others in a running program may be intercepted or trapped based on a determination that such methods may be candidates for preferential call technique. In one embodiment of the present disclosure, a configuration may tag or otherwise specify those methods or segments of code as candidates.

In one embodiment of the present disclosure, preferential method call may apply best to software written in managed-code (e.g., Java™, Python™) because the code here is platform independent and can be more easily trapped in runtime by using the underlying virtual machines. However, the present disclosure does not limit the preferential method call methodology to any specific code; rather programs written in any programming language or the like are applicable. The method trapping, in one embodiment of the present disclosure, may be done by reference replacement. For example, when a method is trapped, the symbolic reference to that method may be replaced by a direct reference to a platform-specific implementation with the best affinity. The library containing this implementation may be preloaded or loaded dynamically. It is not necessary that every method in the program supports the preferential call. For example, only those methods whose affinity varies across platforms, according to a defined threshold or criteria, and for example, whose efficiency may be considered critical for the overall performance may invoke or enable the preferential method call. Whether a method's efficiency is considered critical may be determined based on a defined threshold or criteria.

Figure 2:
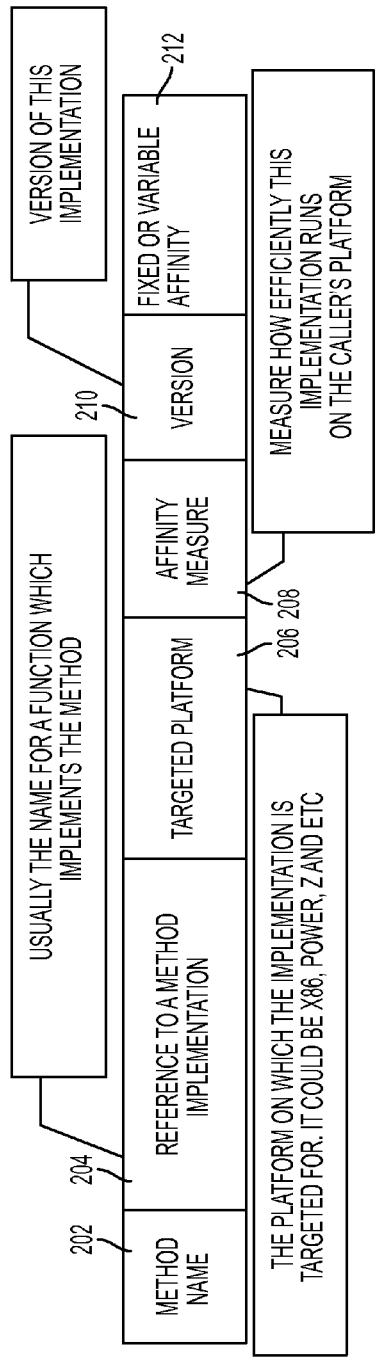
FIG. 2 illustrates an example data structure of affinity table in one embodiment of the present disclosure.

In one embodiment of the present disclosure, affinity table may be a data structure storing the affinity information for each platform-specific implementation of all methods being considered for the preferential method call. FIG. 2 illustrates an example data structure of the affinity table in one embodiment of the present disclosure. Each entry in the table may correspond to one implementation, a particular platform-specific implementation of the method. For example, in Java™, an implementation could be a class member function contained in a jar (Java™ archive) file. One class could exist in multiple jar files, each jar file optimized for one platform.

In one embodiment of the present disclosure, one method may have multiple platform-specific implementations, each corresponding to an implementation for a particular platform, and thus corresponding to multiple entries in the affinity table. The same method with different parameters may correspond to different entries in the affinity table, with each entry carrying different affinity values. An entry may include the following fields: method name 202, for example, "foo( )"; reference to a method implementation 204, e.g., the name for a function which implements the method; targeted platform 206, that specifies the platform on which the implementation is targeted for, e.g., X86, Power, Z, etc.; an affinity measure 208, which indicates the measure of how efficiently this implementation runs on the caller's platform (i.e., the targeted platform); version 210, which specifies the version of this implementation; and a "Fixed or variable affinity" field 212. The "fixed or variable affinity" field 212 indicates whether the affinity measure is constant during the runtime or its value should be updated each time the method is trapped. More or less of the fields shown in FIG. 2 may work as an affinity table. For instance, not all of the fields shown in the example need be present, and/or other additional fields may be present.

As an example, in the context of Java™ applications, a platform-specific implementation could be a class member function in a jar library. A Java™ class supporting preferential method call of the present disclosure in one embodiment may be stored in multiple jar libraries, each optimized for one particular platform. The appropriate jar files are loaded in runtime, depending on the affinity comparison result.

In one embodiment of the present disclosure, the affinity table may be initialized prior to the program execution. Initially, the table may contain all those methods supporting the preferential method call of the present disclosure in one embodiment. This information in one embodiment may be determined by developers and may be supplied as a configuration file to the affinity management process of the present disclosure, e.g., a process that manages procedures and items shown in FIG. 1. A method may include multiple implementations tailored for platforms, each implementation having a record in the affinity table. Affinity measure may be computed and assigned by the affinity management process. If a platform-specific implementation for a method misses its affinity measure, its corresponding affinity measure field in the table may be left empty or include such indication.

In one embodiment of the present disclosure, the affinity table may be updated in runtime. For example, when a method gets trapped in runtime, if its affinity measure is empty, or if its affinity measure needs re-calculation according to the field "Fixed or variable affinity", an affinity estimation procedure may be triggered to compute the affinity and fill in or update the field of the entry.

If a method is called for the first time and thus no entry in the table, its default implementation may be inserted as an entry to the table, with affinity value measured in runtime dynamically. The default implementation may be the implementation for the platform where the method is running on or the program that called the method is running on. For a method called multiple times, whenever its newly measured affinity is determined to be different from the affinity measure stored in the affinity table, the affinity field in the table entry may be updated in one embodiment of the present disclosure.

In response to an occurring method trap, the method name or like identification may be used as a key into the affinity table to find the associated entry data. For example, in one embodiment of the present disclosure, whenever a method trap occurs, the method name is used as the keyword to find all the entries in the affinity table. These entries correspond to the multiple platform-specific implementations. By comparing the affinity measure (the affinity estimation procedure may be triggered if needed), the implementation with the best affinity is chosen and its reference replaces the original symbolic reference. The affinity estimation procedure may be triggered, for instance, dynamically if an entry in that field is empty or needs updating, and if a procedure is available to obtain the measurement.

In one embodiment of the present disclosure, every method in the table contains a default implementation. In cases where the affinity comparison yields no clue due to the failure of affinity estimation, the default implementation can be used and its reference is returned. Having and using a default implementation appropriately ensure that the program can always run even if the preferential method call does not have a preferential implementation selected.

In one embodiment of the present disclosure, affinity comparison takes into account the overhead caused by executing the chosen implementation. If overhead is high enough for neutralizing potential benefits brought by preferring a platform, the platform should not be chosen in one embodiment. Large overhead may occur when making a cross-platform call; e.g., the program initially runs on platform A, it makes a method call which prefers the implementation on platform B. Therefore, this method call becomes a Remote Procedure Call (RPC)-type of call. Such a RPC introduces extra network latency and extra CPU usage. All these overhead needs to be considered in the affinity comparison in one embodiment of the present disclosure. If the overhead is high, the affinity measure may be reduced accordingly in affinity computation.

Affinity Estimation

One or more affinity estimation methods or procedures may be utilized in the present disclosure. There are various affinity estimation methods, depending on the actual scenario and the SLA (Service Level Agreement) that the application (program) is concerned about. For example, for a delay-critical application, one may use method execution time as the affinity; for a computation-intensive application, one may use CPU cycle usage as the affinity; in an energy-efficient scenario, one may use energy consumption as the affinity; any one or more combinations thereof, or other factors may be used. It is possible to combine multiple performance metrics to form a utility function type of measure to gauge the affinity. Also, if performance/price is the concern, the cost for executing an implementation on a platform may be included in the affinity measure. For example, Z CPU cycles are more expensive than Power CPU cycles. By introducing the unit price for CPU cycles into the affinity, computation-intensive methods would prefer a Power platform to reduce total cost.

Affinity may vary over time since the system load is dynamically changing. An example is that the latency affinity measure for a cross-network method is subject to the time-varying background network traffic. For such affinity measures, they may be declared initially as variables, for instance, as discussed above by the field "Fixed or variable affinity" in the affinity table. For an entry with variable affinity field, each time when the affinity is queried, it may be re-computed in an on-demand manner.

Method-Level Dependency Graph

Methods supporting preferential calls may be specified when the affinity table is initialized. The developers may manually create such a specification according to the availability of platform-specific implementations and the dependency between methods. A method-level dependency graph shows the calling relationship between methods in a program or application. A dependency graph can be a useful tool for speeding up the manual process. Specifically, if the developer wants to enable preferential calls for method A and method A is found to call method B in the dependency graph, the developer should also enable preferential calls for method B and any further methods called by method B. As a result, for example, if method B is determined to not be able to run on a platform, method A cannot be preferentially called on that platform as well. A method-level dependency graph can be automatically produced by one or more software tools.

Dependency bundle may aid in preferentially execution of inter-related methods. A dependency graph is initially formed to represent the inter-relationship. Based on the dependency graph, if a method is preferentially executed, all methods it depends on may be preferentially executed as a bundle, in one embodiment of the present disclosure.

Usage Scenarios

Scenario 1: Preferential Java™ Class Loading

Figure 3:
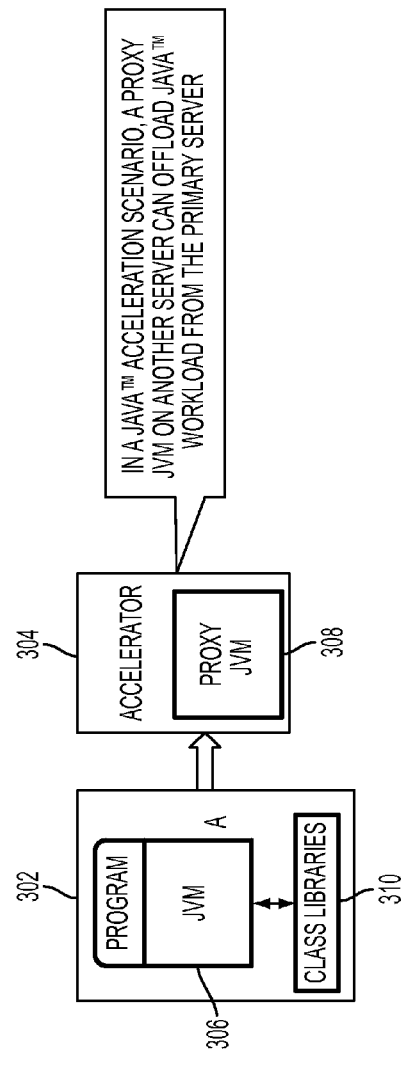
FIG. 3 illustrates an example scenario, in which preferential method call of the present disclosure in one embodiment is applied in a Java™ acceleration prototype.

Scenario 1 is to apply the preferential method call idea in a Java™ acceleration prototype. FIG. 3 describes this scenario. Two servers A 302 and B 304 are different platforms. A Java Virtual Machine (JVM) 306 runs on Server A 302 for processing Java™ workload. On Server B 304, a proxy JVM 308, which may be another JVM with added feature, is developed to offload Java™ workload from Server A 302 to B 304. While pure Java™ calls are offloaded to B 304, Java Native Interface (JNI) calls made on Server A 302 remain on A 302. In the booting phase, both JVM 306 and Proxy JVM 308 need to load many common Java™ class libraries since they read a large number of common Java™ class libraries. If these class libraries 310 are only kept on Server A, the booting for Proxy JVM 308 is extremely low-efficient because each class library file has to be shipped from A 302 to B 304 by RPC (Remote Procedure Call). On average a loaded class generates ~120 RPC calls. Each RPC call needs to cross the network and incurs a network delay. As a result, the bootstrap phase for Proxy JVM is ~1.5 hours.

The preferential method call of the present disclosure may be applied to speed up the bootstrap phase in the above scenario. In the implementation in one embodiment of the present disclosure, Java™ class libraries may have local copies. Here local is referred to Server B 304 and remote is referred to Server A 302 in FIG. 3. In the local copy of libraries, a boolean member variable is added to each Java™ class to indicate whether the class has a local copy. Then, depending on whether a Java™ member function enables preferential calls, a checking in each member function is added to decide whether the local or remote member functions should be called. A configuration file is created to specify which class library file has a local copy. This configuration file is created by Proxy JVM developers. Also, a new class is added to be executed in the bootstrap phase. The added class will read in the configuration file and initialize the Boolean variable within each class. After the above changes, preferential class loading is performed in the bootstrap phase. The preferential method call in this scenario turns out to be very effective: the bootstrap time for Proxy JVM is reduced from 1.5 hours to a few minutes.

Scenario 2: Preferential Character File Reading in Java™

Figure 4:
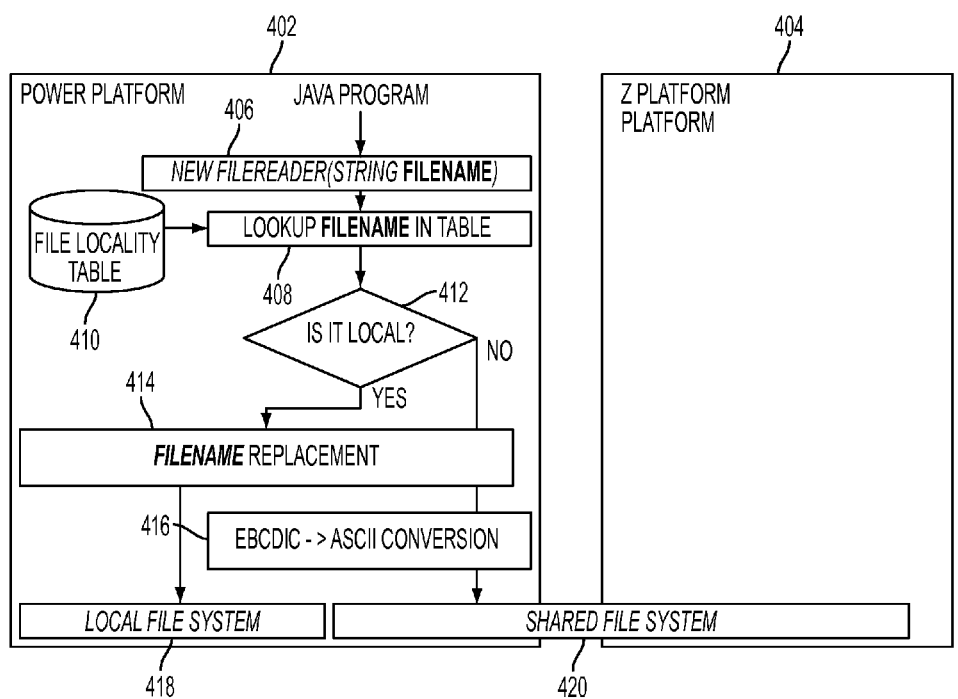
FIG. 4 illustrates another example scenario, which can utilize preferential method call of the present disclosure.

FIG. 4 illustrates another example scenario which can utilize the preferential method call of the present disclosure. The preferential method call may be applied to Java™ file input/output (I/O) for faster file reading in a hybrid system. FileReader is a Java™ class for reading character files. The constructor of this class accepts a filename argument and prepares for reading from this file. If the file is located on a remote server, this file will be read across the underlying distributed filesystems (e.g., Network File System (NFS)). In addition to the drawback of large network latency, this default behavior needs to address inconvenience brought by the character encoding issue. Specifically, character file on different platforms could be encoded in different scheme. Thus, when FileReader constructor is called, the developers need to specify the encoding scheme, which depends on which platform the file is stored.

Applying the preferential method call in one embodiment of the present disclosure addresses both the network latency issue and the inconvenience of character encoding. Referring to FIG. 4, upon the calling of this FileReader constructor method at 406, the input argument filename is looked up at 408 from the affinity table 410 or the like, and may be preferentially replaced by a local copy in one embodiment of the present disclosure at 414, if a local copy exists as tested at 412. Depending on which platform the file is eventually retrieved from (local 418 or shared 420), another method for character encoding/decoding may be called implicitly at 416. In the example of FIG. 4, EBCDIC is the character encoding scheme on Z 404, and ASCII is the encoding scheme on Power 402. In this way, the above two issues are addressed, and this process may occur completely transparent to the Java™ program. This scenario demonstrates the benefit of respecting data locality. In addition, based on the efficiency of running the encoding/decoding algorithms, the appropriate platform to run the method may be determined.

Scenario 3: Preferential Math-Intensive Function Execution

Figure 5:
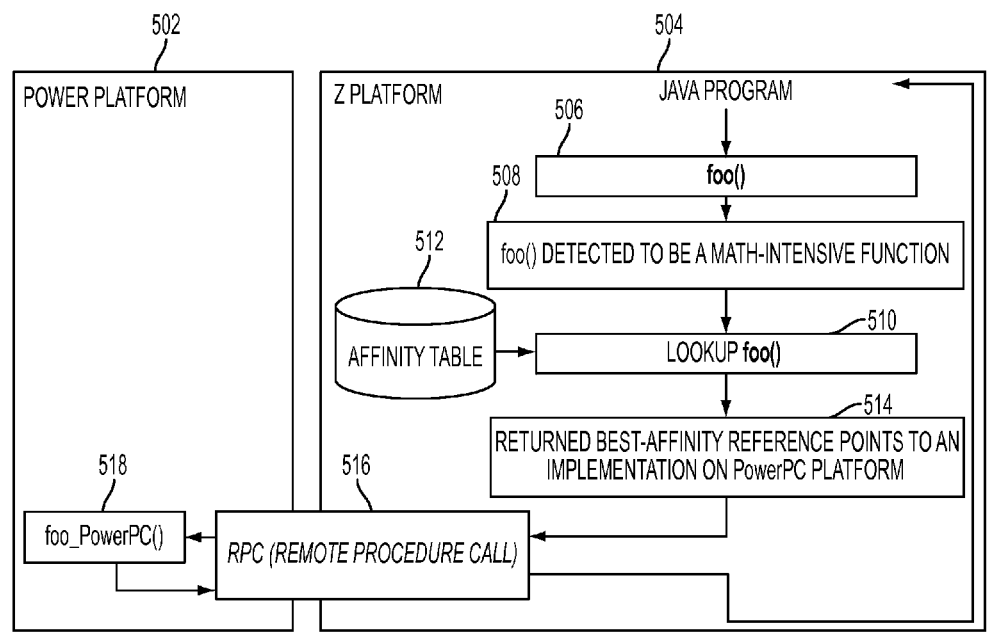
FIG. 5 illustrates an example scenario in which math-intensive functions are offloaded to Power platform in runtime.

In this scenario, the preferential method call in one embodiment of the present disclosure may be applied to place computation-intensive workload from Z to Power. The rationale may be that Power platform in general has better floating point support than Z platform. FIG. 5 illustrates an example scenario in which math-intensive functions are offloaded to Power platform in runtime. For example, when a method foo( ) on Z 504 is called at 506 or trapped, and if it has been detected to have high amount of mathematical computation at 508 (e.g., this can be done by source code analysis), an affinity table 512 may be searched at 510 to detect whether a Power-version implementation for foo( ) exists. If it exists, the Power-version implementation may be returned at 514. At 518, the Power-version implementation may be called instead of the default Z-version. The RPC mechanism at 516 may be used to achieve this cross-system call in one embodiment of the present disclosure. In one embodiment of the present disclosure, the RPC overhead is taken into account when deciding which version of foo( ) is used. Detecting whether a method has mathematical computation may be performed by source code analysis in one embodiment of the present disclosure. One or more criteria may be set to decide whether the method is computation intensive. For instance, if the number of mathematical computation in the method meets or exceeds a threshold, the method may be determined to be computation intensive, warranting the preferential method call option. While looking up foo( ) in the affinity table at 510, the affinity for the PowerPC-specific implementation may be offset due to the cross-platform communication, in one embodiment of the present disclosure.

In another embodiment of the present disclosure, an example of applying preferential method call in software running across a local and remote system is given. The local and remote systems are connected by a network. For performance benefit, a function call in such a scenario should prefer being executed on the local system as long as its required resources are local. To enable preferential method call, each method call in the software is first analyzed to determine whether it should run locally or remotely. The determination technique is to statically analyze the binary/byte code of the method implementation and to create a call graph. For each function call in the call graph, it is checked to determine if resources accessed through the call is locally available or remotely available. If all resources accessed through the native method is locally available, the method may be annotated for local execution. If not, the method may be annotated for remote execution. This methodology of determining localizable native methods may be used to determine affinity measure or factor. For instance, if a native method can be localized, the affinity measure leans toward a "local machine"; if not, the affinity is toward a "remote machine".

In the present disclosure in embodiment, preferential execution of method calls in hybrid systems is provided. An affinity-based preferential method call technique may improve the performance of distributed applications in a hybrid system, e.g., by dynamically executing each work unit in a workload on the platform with the best efficiency factor, e.g., cost/performance ration. For example, the symbolic reference to a method call is trapped at runtime and replaced with a direct reference to a platform-specific implementation with the best affinity.

A method for leveraging function locality may significantly improve software performance in hybrid systems. An affinity-based preferential method call technique provides a feature enabling to execute a method on the platform where the method has the best affinity (such as applying to data reading wherein the data with better locality is preferred to be read, or the method uses other local resources), a feature of updating the affinity in both offline and online manners, a feature to exploit the implicit difference in a hybrid system such that a work item is executed on the place which suits the work item the best. Affinity table may store information about platform-specific implementations for method calls and affinity measures.

Running distributed software in hybrid systems may preferentially call methods on the platform where the method has best affinity and preferentially access data on the server with best locality, which may include (i) intercepting method calls and file reading and looking up the requested item against a table, (ii) selecting matched item in the table with best affinity or locality, and replacing original method name or file name by the name returned from step (ii).

Affinity table may involve an affinity management system which creates and updates the affinity table in both static and dynamic manner. Initially, the affinity table may contain affinity measure for methods which are already known to have implementations tailored for platforms. In runtime, the affinity for a method may be learned from measurement on how efficiently it is executed on a platform, and the affinity computation methodology may be aware of network latencies and bandwidths (or other overhead or environment factors) and use this in the decision process.

While the above description explained the methodology of the present disclosure in terms of executing a method in a program, any other work unit or item, or segment of code in the program may have and be executed with a preferential platform-specific implementation.

Figure 6:
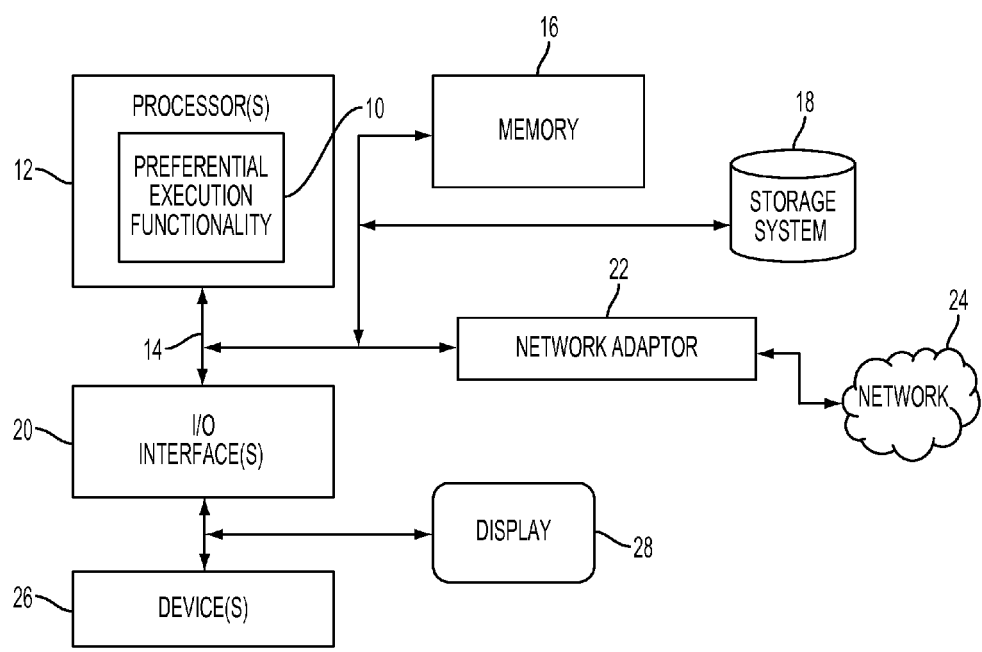
FIG. 6 illustrates a schematic of an example computer or processing system that may implement the preferential method execution system in one embodiment of the present disclosure.

FIG. 6 illustrates a schematic of an example computer or processing system that may implement the preferential method execution system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a preferential execution of method module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for running distributed programs in a hybrid system having heterogeneous platforms, comprising:
    trapping a program's method call in runtime of a program executing on a processor;
    looking up a symbolic reference associated with the trapped method call for one or more platform-specific implementations;
    selecting a platform-specific implementation from said one or more platform-specific implementations based on affinity measure associated with said one or more platform-specific implementations, the affinity measure indicating how efficiently said one or more platform-specific implementations run on respective one or more platforms in said hybrid system;
    returning a direct reference to the selected platform-specific implementation; and
    replacing the symbolic reference associated with the trapped method call with the returned direct reference to the selected platform-specific implementation,
    wherein the hybrid system comprises at least a general-purpose processor and a special-purpose processor, and said one or more platform-specific implementations comprise at least code programmed to execute on the special-purpose processor.

2. The method of claim 1, wherein the runtime of the program continues with execution the program with the replaced direct reference.

3. The method of claim 1, wherein the step of returning includes returning the direct reference to the selected platform-specific implementation and information related to the associated platform.

4. The method of claim 1, wherein the symbolic reference is looked up in a table containing the affinity measure.

5. The method of claim 4, wherein the affinity measure in the table is computed and updated dynamically in runtime.

6. The method of claim 4, wherein overhead associated with running said one or more platform-specific implementations is used in computation of said affinity measure.

7. The method of claim 4, wherein the affinity measure is computed based on execution time, or resource usage, or combinations thereof.

8. The method of claim 1, wherein the program's method call is associated with multiple different platform-specific implementations.

9. The method of claim 1, wherein the program's method call is associated with multiple different platform-specific implementations based on different parameters specified in the program's method call.

10. A method for affinity-based preferential call technique for improving performance of distributed applications in a hybrid system having heterogeneous platforms, comprising:

intercepting in runtime a segment of code in a program being executed on a processor;

determining a platform in the hybrid system for executing said segment of code, the platform determined to run the segment of code with best efficiency among a plurality of platforms in the hybrid system, wherein said segment of code is dynamically executed on said platform determined to run the segment of code with best efficiency, wherein the hybrid system comprises at least a general-purpose processor and a special-purpose processor, and the segment of code has an associated platform-specific implementation programmed to execute on the platform determined to run the segment of code with best efficiency.

11. The method of claim 10, wherein the determining includes looking up a table that includes one or more entries specifying one or more platform-specific implementations associated with the segment of code and efficiency measures.

12. The method of claim 11, wherein said efficiency measures are determined at runtime dynamically, and the table is updated with the most recently determined efficiency measures.

13. The method of claim 10, wherein the step of intercepting is performed if it is determined that the segment of code is a candidate for the affinity-based preferential call technique.

* * * * *